US008091075B2

(12) United States Patent
Bates et al.

(10) Patent No.: US 8,091,075 B2
(45) Date of Patent: *Jan. 3, 2012

(54) METHOD AND APPARATUS FOR BREAKPOINT ANALYSIS OF COMPUTER PROGRAMMING CODE USING UNEXPECTED CODE PATH CONDITIONS (75) Inventors: Cary Lee Bates, Rochester, MN (US); Paul W. Buenger, Eau Claire, WI (US)

(73) Assignee: International Business Machines Corporation, Armonk, NY (US)

( * ) Notice: Subject to any disclaimer, the term of this patent is extended or adjusted under 35 U.S.C. 154(b) by 1098 days.

This patent is subject to a terminal disclaimer.

(21) Appl. No.: 11/930,661

(22) Filed: Oct. 31, 2007

(65) Prior Publication Data
US 2008/0052683 A1   Feb. 28, 2008

Related U.S. Application Data (63) Continuation of application No. 10/821,150, filed on Apr. 8, 2004, now Pat. No. 7,353,427.

(51) Int. Cl.
G06F 9/44 (2006.01)
G06F 11/00 (2006.01)

(52) U.S. Cl. .......... 717/129; 717/127; 717/131; 714/25; 714/38; 714/48

(58) Field of Classification Search .................. None
See application file for complete search history.

(56) References Cited

U.S. PATENT DOCUMENTS

| | | | | |
|---|---|---|---|---|
| 5,050,168 | A | * | 9/1991 | Paterson ........................ 714/35 |
| 5,850,562 | A | * | 12/1998 | Crump et al. ..................... 713/1 |
| 6,016,474 | A | * | 1/2000 | Kim et al. ..................... 717/125 |
| 6,026,362 | A | * | 2/2000 | Kim et al. ..................... 705/317 |
| 6,263,489 | B1 | * | 7/2001 | Olsen et al. ................... 717/129 |
| 6,412,106 | B1 | | 6/2002 | Leask et al. |
| 6,434,741 | B1 | | 8/2002 | Mirani et al. |
| 6,587,967 | B1 | | 7/2003 | Bates et al. |
| 6,587,995 | B1 | | 7/2003 | Duboc et al. |
| 6,658,649 | B1 | | 12/2003 | Bates et al. |
| 6,681,384 | B1 | | 1/2004 | Bates et al. |
| 6,718,484 | B1 | | 4/2004 | Kodera |
| 6,848,097 | B1 | | 1/2005 | Alverson et al. |
| 7,058,928 | B2 | | 6/2006 | Wygodny et al. |
| 7,086,033 | B2 | | 8/2006 | Bates et al. |
| 7,827,540 | B2 | * | 11/2010 | Lien et al. ...................... 717/129 |

(Continued)

OTHER PUBLICATIONS

Kessler, Peter B., "Fast Breakpoints: Design and Implementation", Proceedings of the ACM SIGPLAN 1990 Conference on Programming Language Design and Implementation, White Plains, New York, Jun. 20-22, 1990, pp. 78-84.

(Continued)

*Primary Examiner* — Tuan Dam
*Assistant Examiner* — Isaac Tecklu
(74) *Attorney, Agent, or Firm* — Roy W. Truelson (57) ABSTRACT A conditional breakpoint for debugging computer programming code includes a condition identifying of one or more expected code paths used to reach the breakpoint. The breakpoint is triggered if it is reached during execution using an unexpected code path. Preferably, an expected code path is identified by specifying the expected preceding breakpoint, by specifying basic code blocks which should or should not be encountered before the breakpoint, or some combination thereof. The expected code path condition may be used alone or in conjunction with any conventional breakpoint condition.

10 Claims, 9 Drawing Sheets

U.S. PATENT DOCUMENTS

| | | | |
|---|---|---|---|
| 2001/0011212 A1 | 8/2001 | Raynaud et al. | |
| 2003/0005415 A1 | 1/2003 | Bates et al. | |
| 2003/0066054 A1* | 4/2003 | Aarts et al. | 717/129 |
| 2003/0074650 A1 | 4/2003 | Akgul et al. | |
| 2003/0115576 A1* | 6/2003 | Bates et al. | 717/129 |
| 2003/0196144 A1* | 10/2003 | Swoboda et al. | 714/34 |
| 2003/0208746 A1* | 11/2003 | Bates et al. | 717/129 |
| 2005/0066313 A1* | 3/2005 | Bates et al. | 717/129eb |
| 2005/0066314 A1* | 3/2005 | Bates et al. | 717/129 |

OTHER PUBLICATIONS

Ramsey, Norman, "Correctness of Trap-Based Breakpoint Implementations", Proceedings of the 21st ACM SIGPLAN-SIGACT Symposium on Principles of Programming Languages, Feb. 1994, Portland, Oregon, pp. 15-24.

* cited by examiner

```
main()
{
    state = 0;
    in = fopen( "diet.dat", "r" );

buf[0] = 0
    idx = 0;

while(1)
    {
        if ( feof( in ) ) break;
        ch = fgetc(in);

state = table[state][map(ch) - 1];

if ( state == 9)
        {
            buf[idx] = ch;
            buf[idx+1] = 0;
            idx++;
        }
        if ( state == 10 )
        {
            if ( strstr( buf, "KidsMeal" ) ! = 0 )
            {
                printf( "Saturated Fats: ");
                printf( "%s\n", &buf[1] );
            }
            idx = 0;                <<BP>>
        }                                   701
    }
    fclose(in);
```

FIG. 7

```
main()
{
    state = 0;
    in = fopen( "diet.dat", "r" );

buf[0] = 0
    idx = 0;

while(1)
    {
        if ( feof( in ) ) break;
        ch = fgetc(in);

state = table[state][map(ch) - 1];

if ( state == 9)
        {
            buf[idx] = ch;              ⎫
            buf[idx+1] = 0;             ⎬ 801
            idx++;                      ⎭
        }
        if ( state == 10 )
        {
            if ( strstr( buf, "KidsMeal" ) ! = 0 )
            {
                printf( "Saturated Fats: ");    ⎫
                printf( "%s\n", &buf[1] );      ⎬ 802
            }                                   ⎭
            idx = 0;            <<BP>>
        }
    }
    fclose(in);
```

FIG. 8

METHOD AND APPARATUS FOR BREAKPOINT ANALYSIS OF COMPUTER PROGRAMMING CODE USING UNEXPECTED CODE PATH CONDITIONS

CROSS REFERENCE TO RELATED APPLICATIONS

This is a continuation of U.S. patent application Ser. No. 10/821,150, filed Apr. 8, 2004, entitled "Method and Apparatus for Breakpoint Analysis of Computer Programming Code Using Unexpected Code Path Conditions", which is herein incorporated by reference. This application claims priority under 35 U.S.C. §120 of U.S. patent application Ser. No. 10/821,150, filed Apr. 8, 2004.

The present application is related to U.S. patent application Ser. No. 10/821,148, by Cary L. Bates et al., entitled "Thread-Scoped Breakpoints", filed Apr. 8, 2004, which is herein incorporated by reference.

FIELD OF THE INVENTION

The present invention relates to digital data processing, and in particular to methods and apparatus for analyzing the execution of computer programming code using conditional breakpoints.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises one or more central processing units (CPU) and supporting hardware necessary to store, retrieve and transfer information, such as communication buses and memory. It also includes hardware necessary to communicate with the outside world, such as input/output controllers or storage controllers, and devices attached thereto such as keyboards, monitors, tape drives, disk drives, communication lines coupled to a network, etc. The CPU or CPUs are the heart of the system. They execute the instructions which comprise a computer program and directs the operation of the other system components.

From the standpoint of the computer's hardware, most systems operate in fundamentally the same manner. Processors are capable of performing a limited set of very simple operations, such as arithmetic, logical comparisons, and movement of data from one location to another. But each operation is performed very quickly. Sophisticated software at multiple levels directs a computer to perform massive numbers of these simple operations, enabling the computer to perform complex tasks. What is perceived by the user as a new or improved capability of a computer system is made possible by performing essentially the same set of very simple operations, but using software having enhanced function, along with faster hardware.

In the very early history of the digital computer, computer programs which instructed the computer to perform some task were written in a form directly executable by the computer's processor. Such programs were very difficult for a human to write, understand and maintain, even when performing relatively simple tasks. As the number and complexity of such programs grew, this method became clearly unworkable. As a result, alternate forms of creating and executing computer software were developed.

The evolution of computer software has led to the creation of sophisticated software development environments. These environments typically contain a range of tools for supporting the development of software in one or more high-level languages. For example, interactive source editors support the initial generation of source code by a developer. Source databases may support collections of source modules or source objects, which serve as the component parts of software applications. Front-end compiler/debuggers perform simple semantic verification of the source and reduction to a standard form. Back-end or optimizing compilers generate machine executable object code from the standard form, and may optimize the performance of this code using any of various optimization techniques. Build utilities assemble multiple object code modules into fully functioning computer programs.

Among the tools available in many such programming development environments are a range of diagnostic and debug tools for analyzing the execution of computer programming code, particularly compiled code. A common analytical technique is the use of breakpoints. A breakpoint is a location in a code sequence at which execution of a program may be halted, and the state of the machine examined. A breakpoint may be unconditional, meaning that the execution of the program is halted whenever the breakpoint is encountered, but is more typically conditional, meaning that execution of the program is halted only if certain conditions are met when the breakpoint is encountered. A typical such condition would be the value(s) of one or more program variables.

In general, conditional breakpoints are intended to trigger when something unexpected is happening in the computer program. A programmer will therefore insert multiple breakpoints at respective key locations in the code sequence, and specify the expected values of some key variables as conditions for the breakpoints. If the program is executing as expected, the conditional breakpoints do not trigger. Only if a conditional breakpoint is encountered, and the value(s) of the variable(s) specified as the condition of the breakpoint are something other than what was expected, is program execution halted. Conditional breakpoints are thus used to flag unexpected program conditions, without halting the program and requiring the programmer to analyze machine state in a large number of purely normal conditions.

Various conventional analytical tools support the use of breakpoints in a debug environment. These tools, e.g., allow the programmer to specify the location of a breakpoint, and optionally, a condition for firing the breakpoint based on the value(s) of one or more program variables. If the breakpoint is triggered during execution, the debugger allows the programmer to examine the various program state variables in an effort to understand what is happening during execution.

As useful as these techniques are, applicants have observed that conventional breakpoints don't always identify unexpected program conditions of which the programmer may wish to be aware. It is impractical to specify the state of every single machine variable as a condition for each breakpoint. Debug tools require the programmer to identify the key variables to be used to trigger the breakpoints, and the expected values thereof, but this requires the programmer to anticipate error conditions. It is entirely possible that the key variable(s) identified will have expected values, and therefore not fire the breakpoints, yet something abnormal is going on which the programmer did not anticipate. In such circumstances, it would be desirable to inform the programmer of the abnormality.

As programs grow in size and complexity, the difficulty of anticipating all possible error conditions and debugging code is bound to increase. A need exists for a more effective debug tools which will assist the programmer in identifying and rectifying unexpected conditions arising during execution of the program.

SUMMARY OF THE INVENTION

A computer program debug environment supports the creation and firing of conditional breakpoints within computer code, where the conditions include identification of one or more expected code paths used to reach the breakpoint. The breakpoint is triggered if it is reached during execution using an unexpected code path.

In the preferred embodiment, the expected code path condition is used in addition to any conventional breakpoint firing condition to determine the circumstances under which the breakpoint will fire. The programmer specifies the conventional condition, such as the value of a key program variable, and the expected code path(s) immediately preceding the breakpoint. If the key variable has an unexpected value, or if the breakpoint was reached along an unexpected code path, the breakpoint is fired and the programmer can examine machine state. The programmer could alternatively specify no condition other than that the breakpoint was reached by an unexpected path.

The expected code path can be specified using any of various techniques, including but not limited to: positive or negative specification, i.e., either by specifying those code paths which are expected, thereby implying that other paths are not expected, or by specifying those code paths which are not expected, thereby implying that other paths are expected; specification of code sections which must (or must not) execute before the conditional breakpoint, specification of sequences of code sections, such as basic blocks, specification of previous breakpoints, or using combinations of techniques. In the preferred embodiment, an interactive user interface displays source code to the user, in which those code statements which logically must execute before the selected conditional breakpoint are highlighted. The user may then select code statements which, as a condition of the breakpoint, are required to execute before the breakpoint, or which must not execute before the breakpoint. Optionally, the user may also specify those breakpoints which are expected to immediately precede the selected conditional breakpoint. Selection is performed by selecting, with a pointing device, any statement in a basic block. Responsive to the selection, all statements in the basic block are highlighted, and the debugger automatically inserts hidden blockpoints, similar to breakpoints which never fire. During execution, the system maintains a record of the breakpoints or blockpoints encountered (whether or not a breakpoint was actually fired). When a new breakpoint is encountered in execution, the system compares the expected code path condition with the actual breakpoints or blockpoints encountered during execution. If the actual code path does not match the expectation, the conditional breakpoint is fired, regardless of the condition of any key variable specified as a condition of the conditional breakpoint.

Allowing the programmer to specify expected code paths, and triggering a breakpoint if the path is unexpected, provides the programmer with a new and useful tool in the analysis of computer program behavior. The conventional use of key program variables as triggers is beneficial, but in many circumstances it is difficult to identify a set of key variables which will flag every abnormal program condition. Specifying expected code paths in many cases only requires that the programmer specify what is expected, rather than anticipate what is unexpected, thereby improving the odds that strange and unusual program conditions, not anticipated by the programmer, will be appropriately identified during program execution. This new capability therefore makes it easier to debug and correct computer programs.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Development Environment Overview

The present invention relates to computer program analysis using breakpoints, and particularly by using code path information for triggering conditional breakpoints during execution of a computer program under simulated or actual conditions. Breakpoint analysis is only one of a number of tools available to a developer to analyze and debug computer programs. In general, breakpoint analysis is used as part of a program development process, to identify errors in the flow of program execution, or to obtain a better understanding of the operation of the program. Most typically, a program developer defines multiple breakpoints, each of which is intended to trigger when something unusual happens during execution. The triggering of a breakpoint does not necessarily identify an error as such, but it may help to identify the approximate probable code location of an error, or in some other manner to help localize the bounds of a programmer's inquiry. Generally, an error will be detected sooner or later, but the closer a breakpoint fires to the source of the error, the easier it is for the programmer to diagnose the problem. Typically, development is an iterative process, in which code is written, compiled, tested and analyzed by any of various means (including breakpoint analysis), corrected, re-compiled, and re-tested. However, the present invention is not necessarily limited to this particular environment, and breakpoint analysis might conceivably be used for other purposes or under other circumstances.

DETAILED DESCRIPTION

Figure 1:
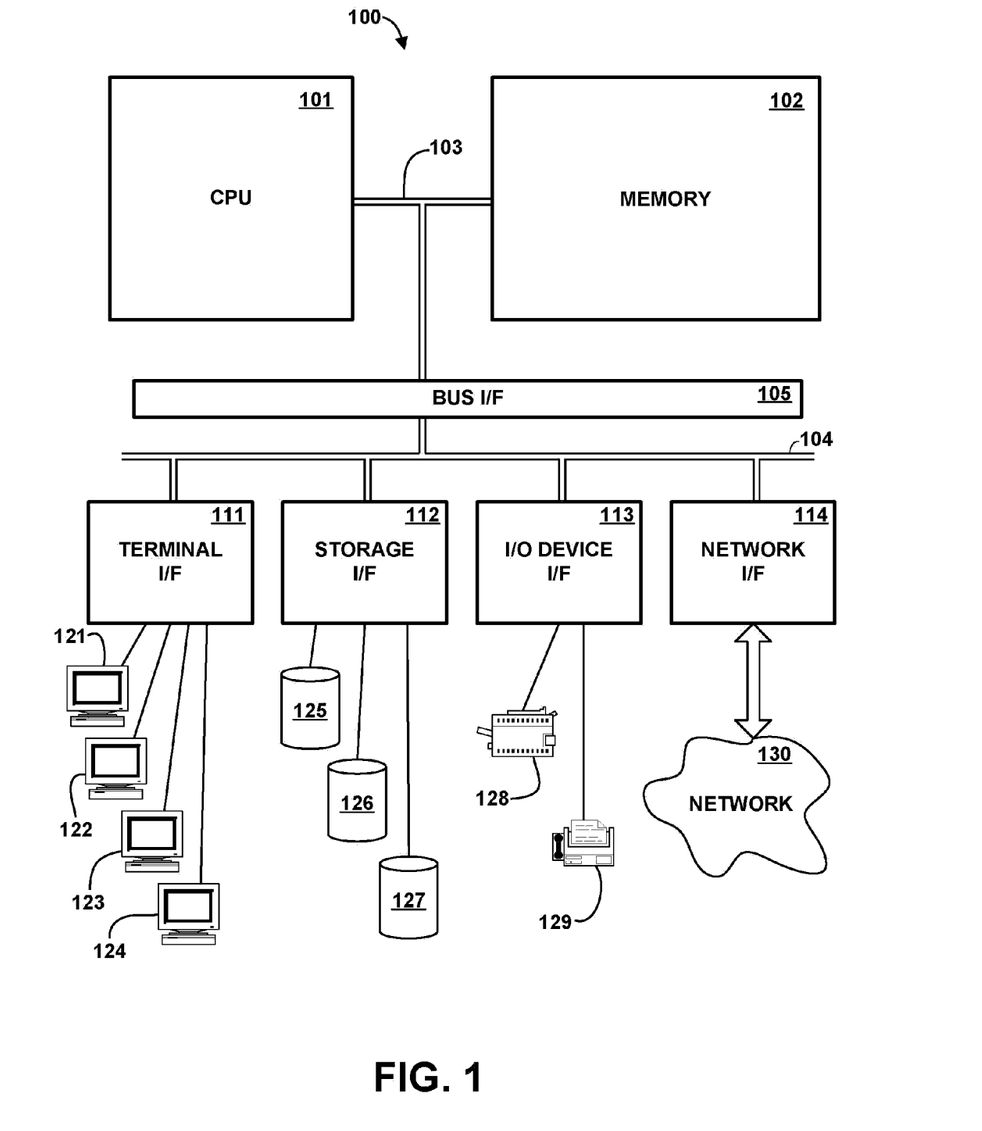
FIG. 1 is a high-level block diagram of the major hardware components of a computer system for developing and analyzing computer programming code using breakpoint analysis based on unexpected code path conditions, according to the preferred embodiment of the present invention.

Referring to the Drawing, wherein like numbers denote like parts throughout the several views, FIG. 1 is a high-level representation of the major hardware components of a computer system 100 for use in developing and analyzing computer programming code using breakpoint analysis based on unexpected code path conditions, according to the preferred embodiment of the present invention. CPU 101 is a general-purpose programmable processor which executes instructions and processes data from main memory 102. Main memory 102 is preferably a random access memory using any of various memory technologies, in which data is loaded from storage or otherwise for processing by CPU 101.

Memory bus 103 provides a data communication path for transferring data among CPU 101, main memory 102 and I/O bus interface unit 105. I/O bus interface 105 is further coupled to system I/O bus 104 for transferring data to and from various I/O units. I/O bus interface 105 communicates with multiple I/O interface units 111-114, which may also be known as I/O processors (IOPs) or I/O adapters (IOAs), through system I/O bus 104. System I/O bus may be, e.g., an industry standard PCI bus, or any other appropriate bus technology. The I/O interface units support communication with a variety of storage and I/O devices. For example, terminal interface unit 111 supports the attachment of one or more user terminals 121-124. Storage interface unit 112 supports the attachment of one or more direct access storage devices (DASD) 125-127 (which are typically rotating magnetic disk drive storage devices, although they could alternatively be other devices, including arrays of disk drives configured to appear as a single large storage device to a host). I/O device interface unit 113 supports the attachment of any of various other types of I/O devices, such as printer 128 and fax machine 129, it being understood that other or additional types of I/O devices could be used. Network interface 114 supports a connection to an external network 130 for communication with one or more other digital devices. Network 130 may be any of various local or wide area networks known in the art. For example, network 130 may be an Ethernet local area network, or it may be the Internet. Additionally, network interface 114 might support connection to multiple networks.

It should be understood that FIG. 1 is intended to depict the representative major components of system 100 at a high level, that individual components may have greater complexity than represented in FIG. 1, that components other than or in addition to those shown in FIG. 1 may be present, and that the number, type and configuration of such components may vary, and that a large computer system will typically have more components than represented in FIG. 1. Several particular examples of such additional complexity or additional variations are disclosed herein, it being understood that these are by way of example only and are not necessarily the only such variations.

Although only a single CPU 101 is shown for illustrative purposes in FIG. 1, computer system 100 may contain multiple CPUs, as is known in the art. Although main memory 102 is shown in FIG. 1 as a single monolithic entity, memory 102 may in fact be distributed and/or hierarchical, as is known in the art. E.g., memory may exist in multiple levels of caches, and these caches may be further divided by function, so that one cache holds instructions while another holds non-instruction data which is used by the processor or processors. Memory may further be distributed and associated with different CPUs or sets of CPUs, as is known in any of various so-called non-uniform memory access (NUMA) computer architectures. Although memory bus 103 is shown in FIG. 1 as a relatively simple, single bus structure providing a direct communication path among CPU 101, main memory 102 and I/O bus interface 105, in fact memory bus 103 may comprise multiple different buses or communication paths, which may be arranged in any of various forms, such as point-to-point links in hierarchical, star or web configurations, multiple hierarchical buses, parallel and redundant paths, etc. Furthermore, while I/O bus interface 105 and I/O bus 104 are shown as single respective units, system 100 may in fact contain multiple I/O bus interface units 105 and/or multiple I/O buses 104. While multiple I/O interface units are shown which separate a system I/O bus 104 from various communications paths running to the various I/O devices, it would alternatively be possible to connect some or all of the I/O devices directly to one or more system I/O buses.

Computer system 100 depicted in FIG. 1 has multiple attached terminals 121-124, such as might be typical of a multi-user "mainframe" computer system. Typically, in such a case the actual number of attached devices is greater than those shown in FIG. 1, although the present invention is not limited to systems of any particular size. User workstations or terminals which access computer system 100 might also be attached to and communicated with system 100 over network 130. Computer system 100 may alternatively be a single-user system, typically containing only a single user display and keyboard input.

While various system components have been described and shown at a high level, it should be understood that a typical computer system contains many other components not shown, which are not essential to an understanding of the present invention. In the preferred embodiment, computer system 100 is a computer system based on the IBM AS/400™ or i/Series™ architecture, it being understood that the present invention could be implemented on other computer systems.

Figure 2:
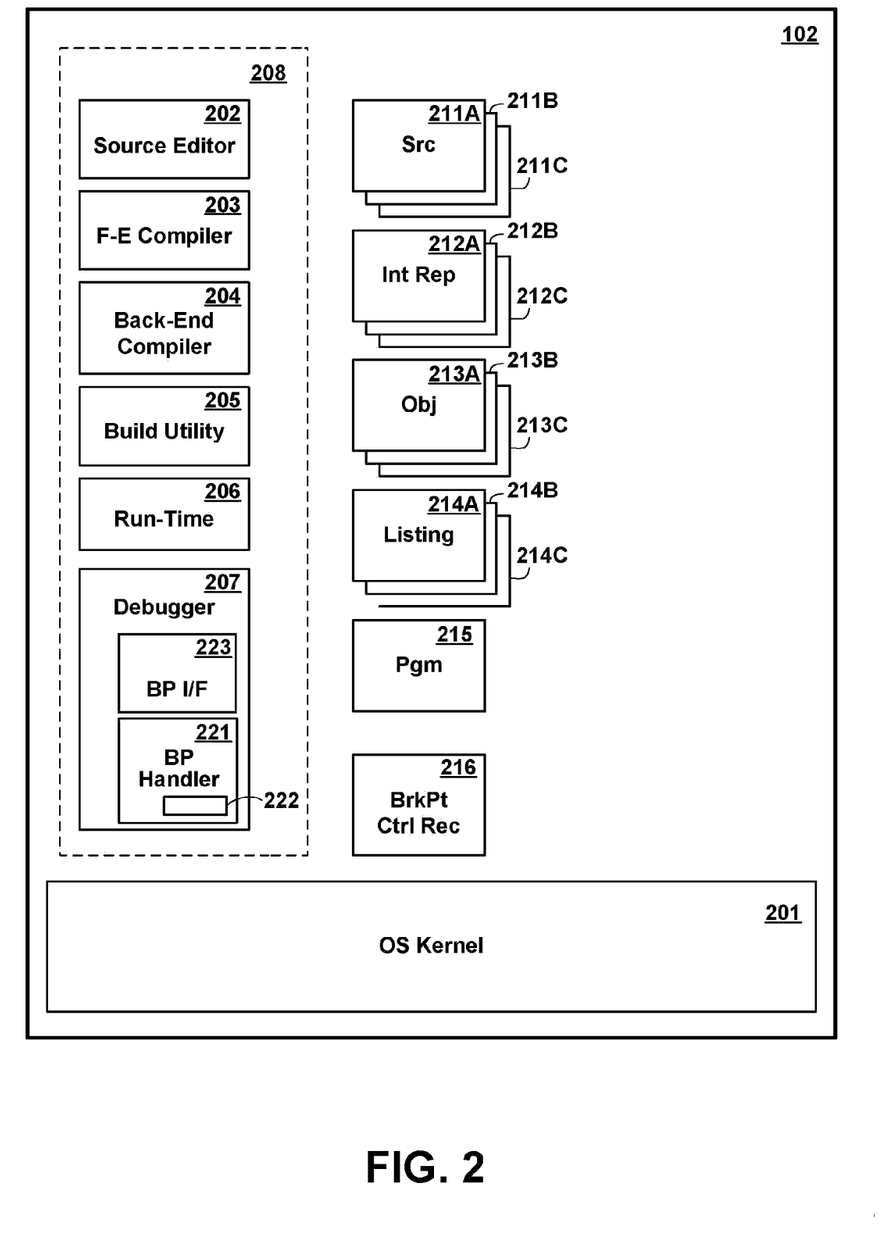
FIG. 2 is a conceptual illustration of the major software components of a computer system for using breakpoint analysis based on unexpected code path conditions, according to the preferred embodiment.

FIG. 2 is a conceptual illustration of the major software components of system 100 in memory 102. Operating system kernel 201 provides various low-level software functions, such as device interfaces, management of memory pages, management and dispatching of multiple tasks, and so forth, as is well-known in the art. Various programs such as source editor 202, front-end compiler 203, back end (optimizing) compiler 204, build utility 205, run time utility 206, and debugger 207 form an integrated development environment 208 for producing executable computer programming code.

Source editor 202 is an executable computer program which supports the creation and editing of source code for other computer programs, using any of various known techniques. Source files 211A-211C (herein generically referred to as feature 211) are files containing source code which are created and edited using source editor 202. Source editor 202 may be a general-purpose free-form text editor for editing text files, which is non-specific to a programming language, or may a special-purpose source editor for one or more programming languages.

Front-end compiler 203 is an executable program which converts source files 211A-C to corresponding files in an intermediate representation 212A-212C (herein generically referred to as feature 212). Intermediate representations may take any of various forms, but typically they provide some form of commonality between different source or object forms. I.e., source code written in different forms may be compiled by different front-end compilers to a common intermediate form for further compilation by a common back-end compiler. Alternatively, source code may be compiled by a single front-end compiler to a common intermediate form for use on different hardware platforms, the common intermediate form being then compiled by different back-end compilers associated with different respective hardware.

Back-end compiler 204 is an executable computer program which compiles the intermediate representation files 212A-C into corresponding object code modules 213A-213C (herein generically referred to as feature 213) of executable statements. Typically, back-end compiler has the capability to perform certain code optimizations, although it need not necessarily be an optimizing compiler. Optimization is often disabled during development, in order to obtain a closer correlation of source statements to compiled object code. Back-end compiler further has the capability to generate corresponding listing files 214A-214C (herein generically referred to as feature 214) as part of the compilation process. A listing 214 correlates instructions and variable locations in the executable object code with statements and variables in the intermediate representation 212 or source representation 202.

Build utility 205 is an executable computer program which builds a program 215 developed by development environment 208 by incorporating or binding multiple object code modules. Run-time support module 206 is low-level executable program code which provides necessary functions enabling a program built by build utility 205 to execute on system 100.

Debugger 207 is an executable program which is used to assist the programmer in analyzing executable computer programming code for defects. Debugger may provide the programmer with various functions, as are known in the art. In particular, in accordance with the preferred embodiment, debugger 207 includes breakpoint handler 221 for handling breakpoints encountered during execution program 215, and a breakpoint definition interface 223 for interactively definition breakpoint conditions.

Breakpoint handler 221 is an executable run-time routine which is invoked upon encountering a breakpoint during program execution. In the preferred embodiment, the debugger monitors program execution when running in a debug mode, an invokes the breakpoint handler when a breakpoint is encountered. Thus, no modification of the object code is required. It would alternatively be possible to support breakpoints by using "hooks" in the code itself, i.e., statements which directly call an external breakpoint handling routine, or by inserting in-line breakpoint handling code in the source code. Use of the debugger and its breakpoint handler generally provides greater flexibility to modify breakpoints, although it is not necessarily the most efficient from the standpoint of computer execution time. When invoked during execution, breakpoint handler 221 uses breakpoint control record 216 to determine the applicable conditions for each breakpoint, determines whether the conditions for breaking out of the program are satisfied, returns control to the program for continued execution if the breakpoint conditions are not satisfied, and halts program execution if the conditions are satisfied, as described more fully herein. Typically, when program execution is halted, a visualization function in debugger 207 will display information about program state to the programmer, as is known in the art. Among the internal state variables maintained by breakpoint handler 221 is a record of breakpoints and blockpoints encountered 222, which identifies the blockpoints encountered during execution, and the last breakpoint which was encountered during program execution, regardless of whether that breakpoint caused a halt in program execution.

Although source editor 202, front-end compiler 203, back-end compiler 204, build utility 205, run-time support module 206, and debugger 207 are shown as separate entities in FIG. 2, it will be understood that these are often packaged together as part of an integrated application development environment 208. Although breakpoint handler 221 is shown as an executable routine within debugger 207, breakpoint handler might be a separate routine or might be contained within some other program. Furthermore, it will be appreciated that some or all of these functions, and in particular run-time support, are often incorporated into an operating system. Additionally, although functional modules 202-207 are depicted in FIG. 2 on a single computer system 100 for completeness of the representation, it is not necessarily true that all functions will be present on a single computer system or will be performed on a single computer system. For example, editing of source code may be performed by source editors located in a distributed manner in individual workstations, while compiling, building and analysis of code might be performed by a centralized server.

Although a certain number of source modules, object modules, application programs and service programs are shown in the conceptual representation of FIG. 2, it will be understood that the actual number of such entities may vary, and in particular, that in a complex program development environment, the number of such entities is typically much larger. Furthermore, it will be understood that various entities could be stored in a distributed fashion on multiple computer systems.

While the software components of FIG. 2 are shown conceptually as residing in memory 102, it will be understood that in general the memory of a computer system will be too small to hold all programs and other data simultaneously, and that information is typically stored in data storage devices 125-127, comprising one or more mass storage devices such as rotating magnetic disk drives, and that the information is paged into memory by the operating system as required. Furthermore, it will be understood that the conceptual representation of FIG. 2 is not meant to imply any particular memory organizational model, and that system 100 might employ a single address space virtual memory, or might employ multiple virtual address spaces which overlap.

Figure 3:
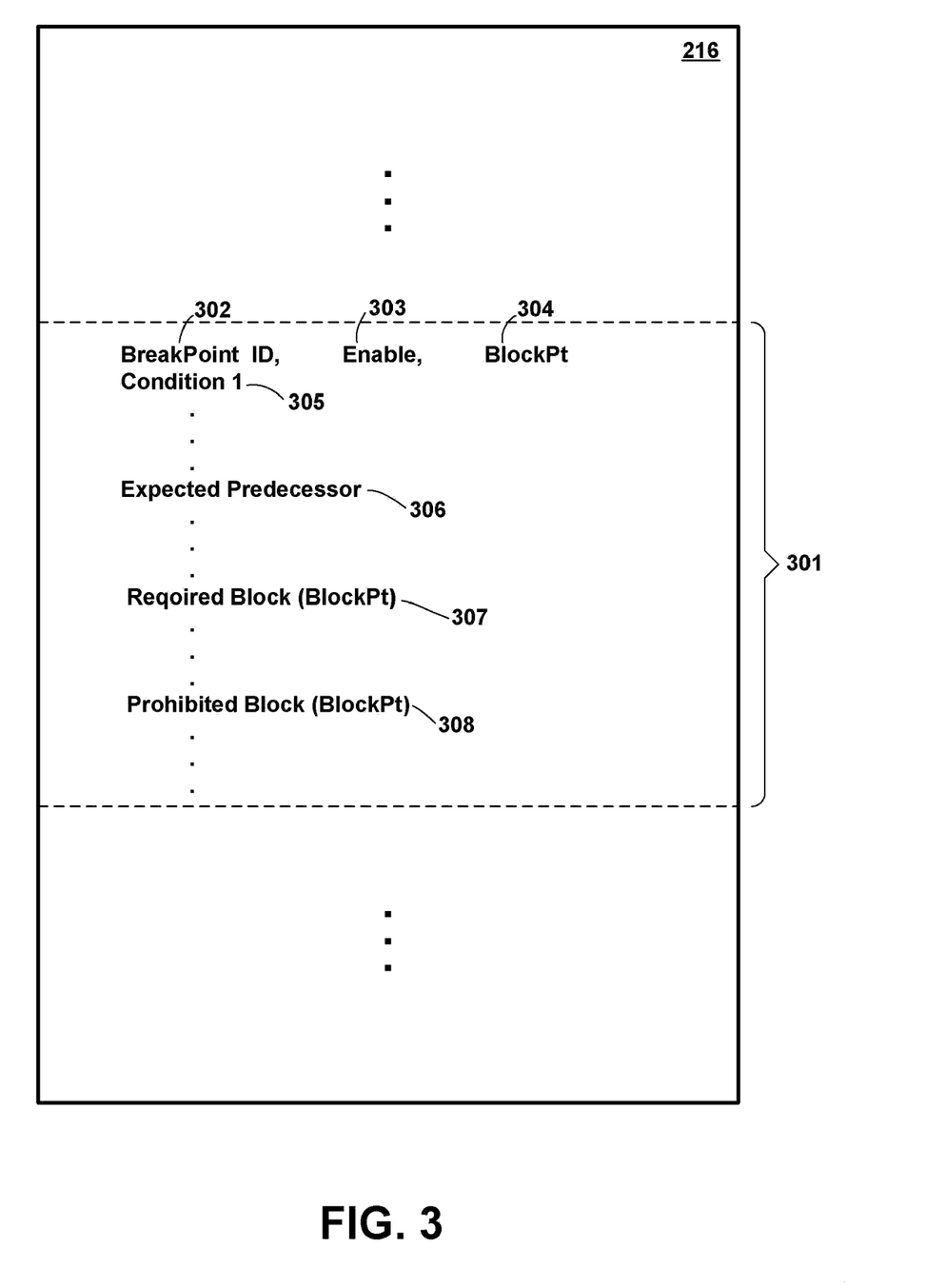
FIG. 3 is a conceptual illustration showing the structure of a breakpoint control record for triggering a breakpoint during execution, according to the preferred embodiment.

FIG. 3 is a conceptual illustration showing a structure of breakpoint control record 216, according to the preferred embodiment. Breakpoint control record 216 is conceptually a set of breakpoint definition entries 301 (of which only one is depicted in FIG. 3), each entry corresponding to a respective breakpoint or blockpoint in the code. As used herein, a blockpoint is a marking device, which uses the breakpoint handler to make a record of the code path during execution; when encountered during execution, it invokes the breakpoint handler, similar to a breakpoint, but it never fires to halt program execution. The definition entries 301 may be indexed or organized according to any available means which will conveniently permit breakpoint handler 221 to determine the entry applicable to an encountered breakpoint or blockpoint.

Referring to FIG. 3, a breakpoint definition entry 301 contains a breakpoint identifier 302, an enable bit 303, a blockpoint bit 304, one or more conditions 305, one or more expected predecessor breakpoints 306, one or more required pathway blocks 307, and one or more prohibited pathway blocks 308. An entry could contain additional data, such as an action to be taken if the breakpoint condition is met. Breakpoint identifier 302 is any form of data sufficient to uniquely identify the origin of the breakpoint defined by entry 301. For example, breakpoint identifier 302 may be a pointer to a code location at which the breakpoint is defined. It could alternatively be a statement number correlated to statements in listing 214, or some other form of unique identifier. Enable bit 303 is a single bit reflecting whether the breakpoint defined by entry 301 is enabled. A programmer may define a large set of breakpoints, and choose to selectively enable subsets of those breakpoints during particular program executions. Blockpoint bit 304 is a single bit which determines whether the breakpoint definition entry 301 defines a blockpoint. If blockpoint bit 304 is set, then the remaining fields 305-308 of the definition entry are not used, and may be omitted. Each condition 305 defines a separate set of circumstances for triggering the breakpoint. Often, only a single condition will be defined, although it is possible to define multiple conditions. Where multiple conditions are expressed, they are logically ORed, so that the breakpoint is triggered if any of the conditions is met. The condition may be expressed using any conventional means. Typically, a condition involves the state of a program variable, i.e., the variable is equal to, greater than or less than some predetermined value, or some other program variable. However, any condition known in the art of breakpoint could be used.

Two special case condition values are defined for condition 305. The first special case condition value is simply "True", indicating that the corresponding breakpoint is unconditional, and triggers any time it is encountered during execution. The second such special case value is "False", indicating that the corresponding condition for triggering a breakpoint is never met. A "False" value may be used where it is desired to trigger the breakpoint only if the breakpoint has been reached by an unexpected code path. A "False" value may also be used as a hidden breakpoint for purposes of marking a code path. I.e., in accordance with the preferred embodiment, unexpected code paths are identified by use of predecessor breakpoints. The programmer may define a first "hidden" breakpoint, which never triggers, and a second breakpoint, which triggers if the first breakpoint was not the immediately preceding breakpoint encountered during execution.

Each expected predecessor 306 identifies another breakpoint which is expected as an immediate predecessor to the defined breakpoint. A single expected predecessor, or multiple expected predecessors, may be defined. In operation, breakpoint handler compares the actual predecessor breakpoint (the most recently encountered breakpoint, from breakpoints/blockpoints encountered record 222 in memory) to each breakpoint in the list of expected predecessor breakpoints 306. If the most recently encountered breakpoint is not in the list of expected predecessor breakpoints, then the breakpoint is triggered, regardless of whether any of the conditions expressed in conditions 305 are met. Thus, the expected predecessors are in effect a single additional condition for triggering the breakpoint, which is logically ORed with all the other conditions.

Two special values are defined for the expected predecessor field 306. One is a wild card value, indicating that all breakpoints are considered expected predecessors. The effect of such a wild card value is to deactivate triggering of the breakpoint for an unexpected predecessor breakpoint. By default, the breakpoint entry is initialized to this wild card value, and can be altered by the programmer. The other special value is a "no predecessor" value, which is used where there is no expected predecessor, i.e., it is expected that the breakpoint will or may be the first breakpoint encountered during execution.

Each required pathway block 307 identifies a basic block of code which is expected to execute at least once before the breakpoint defined by the breakpoint definition entry 301 is encountered during execution. A basic block of code is marked by a blockpoint inserted into the basic block. When the subject breakpoint is encountered during execution, the breakpoint handler compares each required pathway block 307 in the definition entry 301 to the list of blockpoints already encountered. If any required pathway block 307 has not been encountered during execution, the breakpoint is triggered, regardless of whether any of the conditions expressed in conditions 305 are met, and regardless of whether any other expected code path condition is met. The required pathway block 307 may contain a null value, indicating that no basic blocks are required.

Each prohibited pathway block 308 identifies a basic block of code which is should not execute before the breakpoint defined by the breakpoint definition entry 301 is encountered during execution. When the subject breakpoint is encountered during execution, the breakpoint handler compares each prohibited pathway block 308 in the definition entry 301 to the list of blockpoints already encountered. If any prohibited pathway block 308 has been encountered during execution, the breakpoint is triggered, regardless of whether any of the conditions expressed in conditions 305 are met, and regardless of whether any other expected code path condition is met. The prohibited pathway block 308 may contain a null value, indicating that no basic blocks are prohibited.

It should be understood that FIG. 3 is a conceptual illustration for purposes of explaining the breakpoint analysis technique, and that the actual structure of data defining multiple breakpoints may be more complex. In particular, entries will typically contain at least some additional data (not shown). E.g. entries may contain forward and backward pointers, pointers to a parent or root node, maintenance or state bits, counters, and so forth. Such data may be used to support the indexing method used for locating a breakpoint definition, for counting the number of times a breakpoint is encountered or triggered, etc. Entries may also contain additional information of possible use to the programmer, such as a descriptive text field for describing the intended purpose of a particular breakpoint.

In accordance with the preferred embodiment, a programmer analyzes code by defining multiple breakpoints, and defining for at least some conditional breakpoints a respective set of expected code path conditions. The program is then run in debug mode, wherein the debugger monitors execution, and triggers any breakpoints for which the applicable triggering conditions are met. In addition to any other conventional triggering conditions, a conditional breakpoint is triggered if the code path followed during execution does not match the defined expected code path conditions. Upon triggering the breakpoint, the programmer is informed of the cause of triggering. Thereafter, the programmer may use any of various conventional techniques to ascertain the cause of the apparently abnormal program behavior. This process is explained in further detail, with reference to the accompanying figures, below.

Figure 4:
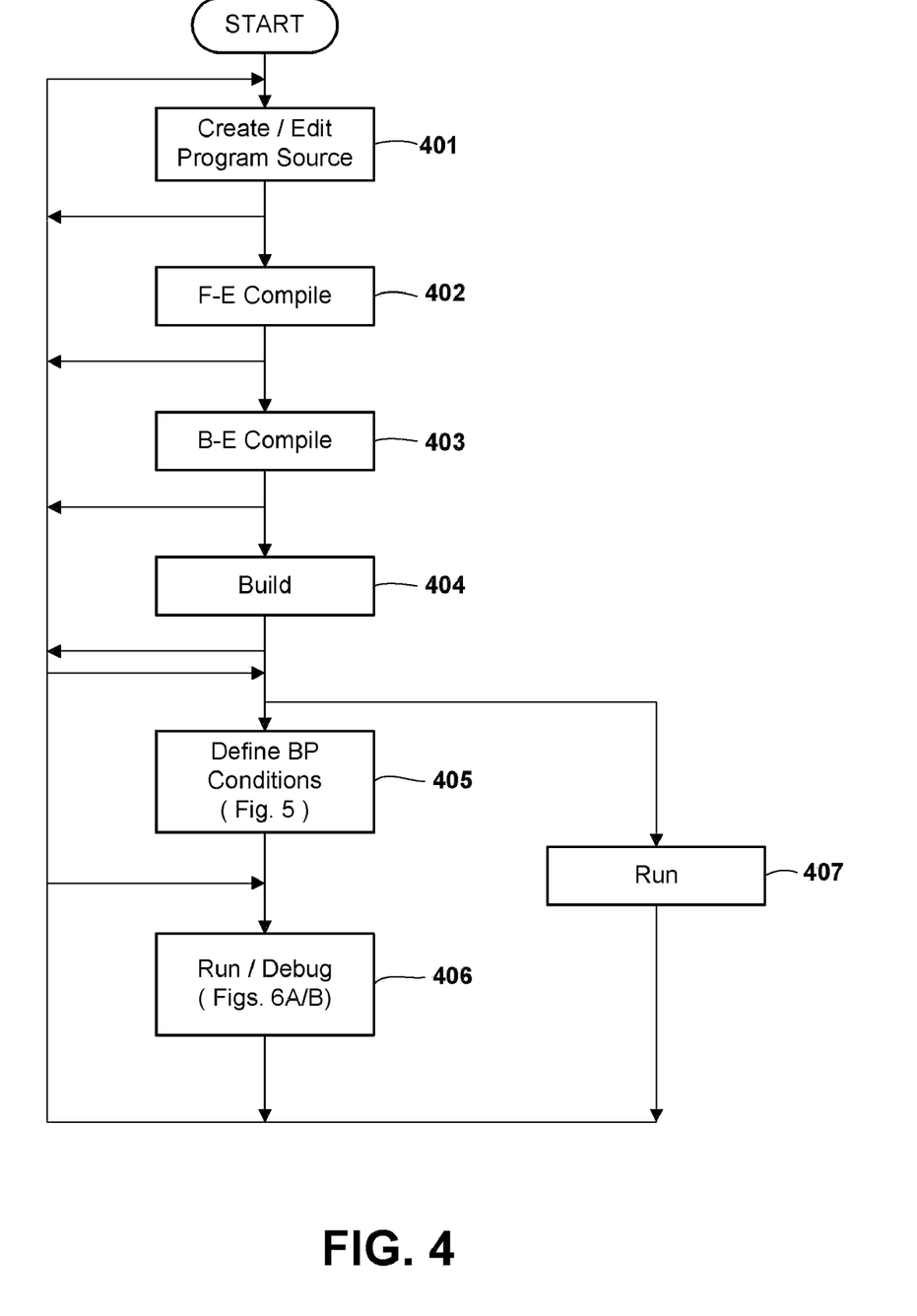
FIG. 4 is a high-level flow diagram showing the overall process of developing programming code using breakpoint analysis, according to the preferred embodiment.

FIG. 4 is a high-level flow diagram showing the process of developing a computer program 215 using integrated development environment 208. In particular, one of the stages of development involves breakpoint analysis, as described herein. Breakpoint analysis is typically performed iteratively on different version of program 215, which is repeatedly modified and re-analyzed until a desired result is achieved.

Referring to FIG. 4, a programmer creates and/or edits one or more source files 211 using source editor 202 (block 401). Source editing may be accomplished using any conventional technique, and is typically performed using an interactive on-screen editor. Portions of a source file or modules may be imported from source libraries or other applications, as is particularly common in the case of so-called object-oriented programming environments. When finished editing, the edited source file 211 is saved in storage for later compiling and further editing.

The programmer may then continue to edit the source file (as shown by the flow path returning to block 401), or may proceed to compile the source. Preferably, the source file 211 is processed by front-end compiler 203 to produce an intermediate code representation 212 (block 402), which is also saved in storage. Where the front-end compilation is unsuccessful, i.e. one or more errors were detected in the source file, the programmer will return to further edit the source (shown by the flow path returning to block 401). Following successful completion of the front-end compile, the programmer may return to block 401 to perform further editing operations, or may continue to back-end compilation (block 403). Back-end compilation produces object code 213 and compilation listing 214. Back-end compilation is performed in accordance with any conventional compilation techniques, which may or may not include any of various code optimizations. Although in the preferred embodiment, compilation is a two-stage process producing an intermediate code version, it will be understood that in some development environments, compilation is an indivisible process and no intermediate representation is produced.

Figure 7:
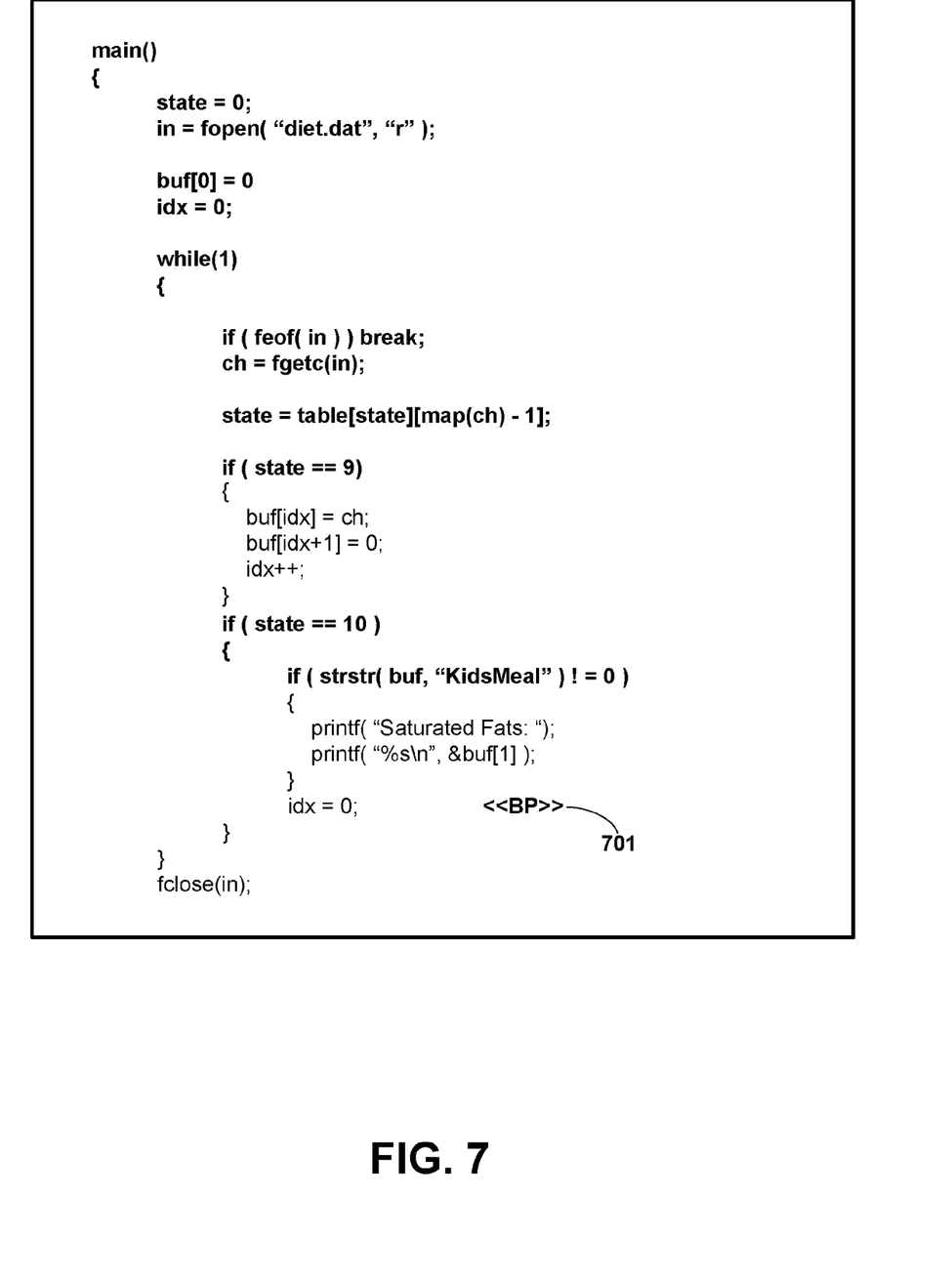
FIGS. 7 and 8 are examples of interactively displayed source code during a process of defining expected code path conditions for a breakpoint, according to the preferred embodiment.
Figure 8:
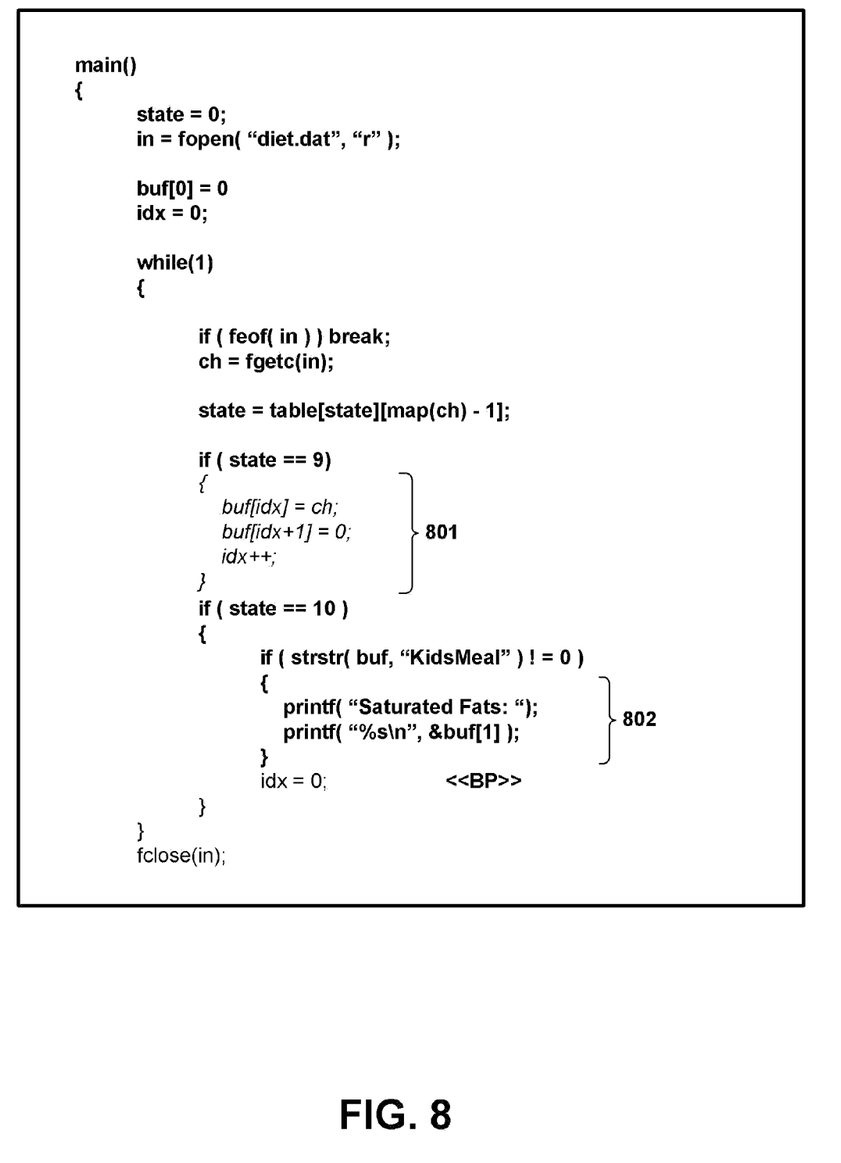

Following the back-end compilation, the programmer may again return to block 401 to perform further editing operations, or may continue to build a program 215 from multiple object modules 213 using build utility 205 (block 404). After the build process, the programmer may again return to block 401 to edit the source, or may perform another build (e.g., because one of the other included object modules has changed), or may execute the program, either by running in a debug mode (blocks 405 and 406) or running normally without a debugger enabled (block 407). Typically, the debug mode is used when the programmer is attempting to gain specific insight about a particular problem of program behavior. Running without the debugger enabled might be more commonly used to verify that the code meets requirements, as by running a series of test cases and verifying the results observed. Any of these processes may be repeated indefinitely (as indicated), or may cause the programmer to return to block 401 to again edit the source.

Where the programmer elects to execute the program in debug mode, the programmer may first define one or more breakpoints. Preferably, this is done in an interactive breakpoint editing session, in which debugger displays necessary information to the programmer and prompts the programmer for required input. I.e, in the preferred embodiment, the debugger displays a source code listing on an interactive display screen, and the programmer may navigate the source code using any conventional navigation screen tools, select locations from the screen using a pointing device (such as a mouse) or any other selection means, and input information into pop-up editing windows and the like, as is known in the art. Some example displays are shown in FIGS. 7 and 8. The process of defining breakpoints is represented in FIG. 4 as block 405, and shown in greater detail in the flow diagram of FIG. 5.

It will be understood that, due to the iterative nature of the development process, breakpoint definitions used in a previous debug session may be re-used to again debug the code. These earlier breakpoint definitions may be re-used exactly as they are, or may first be modified by adding new breakpoints or editing existing breakpoints. Alternatively, a new set of breakpoint definitions may be created from scratch when running in debug mode.

Figure 5:
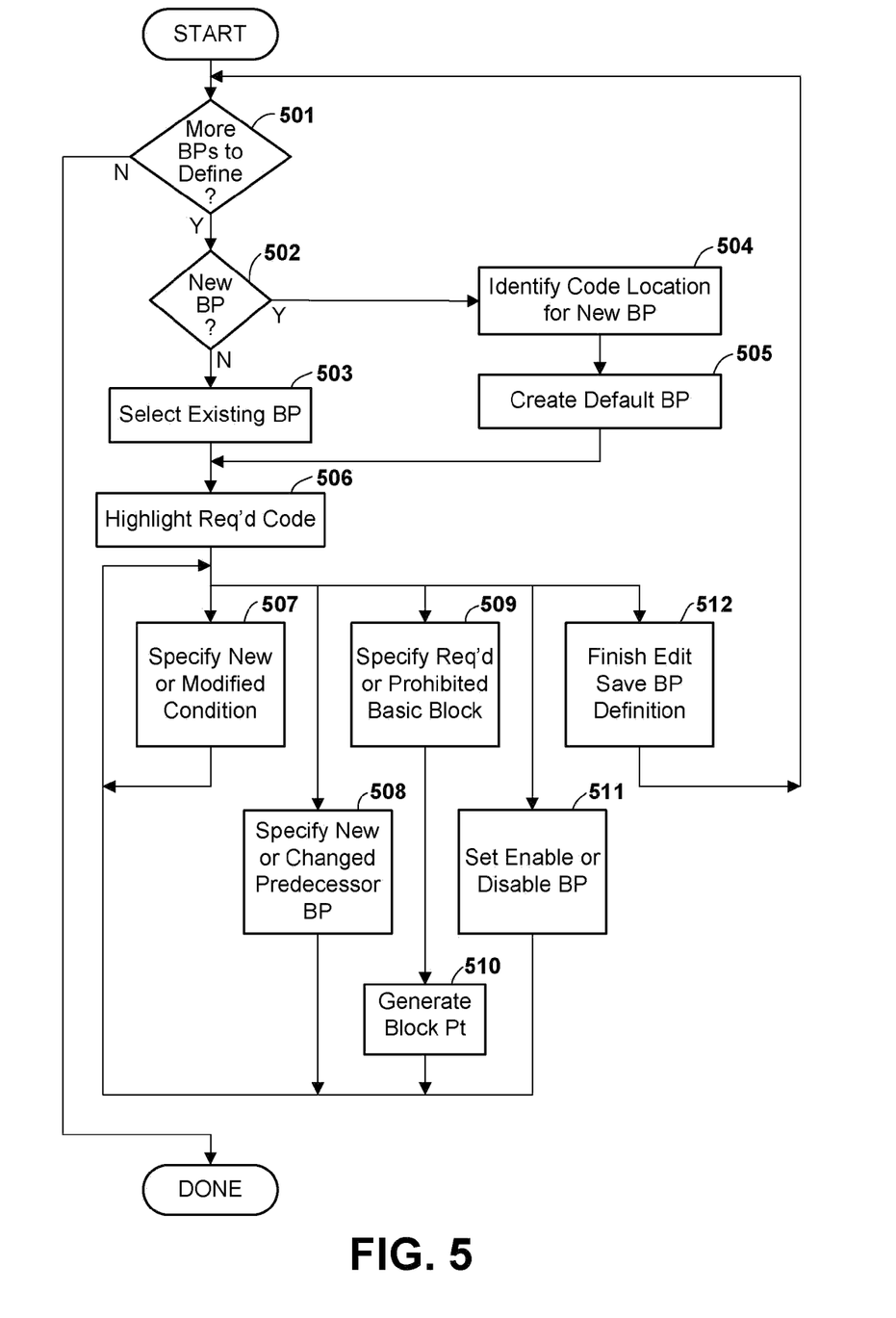
FIG. 5 is a flow diagram showing in expanded form the process of defining breakpoints for breakpoint analysis, within the process of FIG. 4, according to the preferred embodiment.

Referring to FIG. 5, if any more breakpoints need to be defined (newly created or edited), the 'Y' branch is taken from block 501. In this case, blocks 502-512 illustrate the steps involved in defining a breakpoint. When all breakpoints have been suitably defined, the 'N' branch is taken from block 501 to complete the breakpoint definition process.

If the programmer chooses to edit an existing breakpoint (the 'N' branch from block 502), a breakpoint for editing is interactively selected using any known or hereafter developed interactive selection technique (block 503). If the programmer chooses to define a new breakpoint (the 'Y' branch from block 502), the programmer interactively selects a code location for the new breakpoint (block 504). In response, debugger 207 generates a breakpoint definition having a default set of values for the selected breakpoint location (block 505). Any convenient set of values may be chosen as defaults. E.g., the breakpoint might be enabled by default, unconditional by default (condition 305 is "True"), and have the global "All" as the defined expected predecessor 306.

In response to selecting a breakpoint, the debugger highlights those basic blocks of code which must necessarily execute before the selected breakpoint (step 506). "Highlighting" means merely that selective code portions are displayed on the screen in a distinctive form; highlighting may be accomplished, e.g., by using different type fonts, color, or other attributes such as boldface, underlining, blinking, etc. A basic block is the smallest sequence of executable statements which have only one entry point and one exit point, and therefore always execute together (if one statement of the block executes, all statements of the block execute). Back-end compiler 204 typically performs basic block analysis as part of the compilation, and may generate a basic block map (which may be part of the listing) for use by the debugger. Alternatively, the debugger may analyze the source or compiler listing to generate its own basic block map.

FIG. 7 shows a simple example of a computer programming code display in which basic blocks are highlighted. In the example of FIG. 7, a breakpoint 701 is inserted at the second occurrence of the statement: idx=0. In response to the selection of this breakpoint, certain source code statements appear in highlighted form (represented in FIG. 7 by boldface type, it being understood that other forms of highlighting could alternatively be used). The boldface statements are the statements which must necessarily execute before encountering the selected breakpoint.

From the interactive display screen, the programmer may choose to add a new condition or modify an existing condition specified in condition specifier 305 within the breakpoint definition entry 301 (block 507). In this case, the programmer interactively specifies the new or modified condition, using any conventional method. Control then returns to the point just after block 506, from where the programmer may make another selection.

From the same interactive display screen, the programmer may also choose to add or modify an expected predecessor breakpoint 306 from the list of expected predecessor breakpoints in the breakpoint definition entry 301 (block 508). In this case, the programmer interactively selects a new breakpoint as a predecessor, or modifies (e.g., deletes) a previously selected predecessor breakpoint. Selection of a predecessor breakpoint may be accomplished by navigating to the predecessor breakpoint's location in the source code and selecting it, or by selecting certain special codes (such as the wildcard code) from a menu. Selection of such a predecessor breakpoint for addition/deletion causes it to be added to or deleted from the variable-length list of expected predecessors 306. Control then returns to the point just after block 506.

From the same interactive display screen, the programmer may also choose to add or modify a required pathway basic block 307 or prohibited pathway basic block 308 of the source code from the list of required and prohibited blocks in the breakpoint definition entry 301 (block 509). In this case, the programmer interactively selects an arbitrary source code statement from the display, and indicates whether the statement is part of a required block or prohibited block. In response, the interactive interface highlights all statements in the same basic block as the selected statement. The form of highlighting used is preferably different for required blocks and prohibited blocks. The highlighting used for required blocks may be the same as that used in block 506 for those statements which necessarily execute before the selected breakpoint. FIG. 8 shows an example of the source code of FIG. 7, in which the basic block within the 'if (state==9)' condition is selected as a prohibited block 801 (highlighted in italics) and the basic block within the 'if (state==10)' condition is selected as a required block 802 (highlighted in bold), it being understood that other forms of highlighting could be used.

In response to adding a basic block to the list of prohibited blocks or required blocks, the debugger generates a blockpoint in control record 216 (if such a blockpoint does not already exist) to mark the basic block (block 510). The blockpoint may be inserted at any consistent location in the basic block, e.g., the last statement in the basic block. The blockpoint is inserted automatically, without requiring further input by the programmer. As explained above, the blockpoint is recorded as a breakpoint definition entry 301 having an identifier field 302, enable bit 303, and blockpoint bit 304, but no further information. In the case of a blockpoint, the enable bit 303 is not used. Control then returns to the point just after block 506.

From the same interactive display screen the programmer may also choose to change the enable status of the selected breakpoint (block 511). I.e., the programmer changes the breakpoint from enabled to disabled, or vice-versa. Such a selection causes a change to enable bit 303 in the breakpoint definition accordingly.

When all changes to the selected breakpoint have been specified, the definition is saved in the breakpoint control record 216 (block 512), and control returns to block 501, from which the programmer may continue to define additional breakpoints or end breakpoint definition.

It will be understood that additional editing options could be offered to the programmer. For example, certain global editing operations could be offered, such as global enabling or disabling of all defined breakpoints, global inclusion or deletion of an expected predecessor breakpoint, etc. Further, although only one breakpoint control record 216 is shown in FIG. 2, there could be multiple such records for a particular program, each being used for different purposes in different debug sessions.

After defining breakpoints as described above, the program is executed in debug mode. Different debuggers may have different capabilities for execution in debug mode, but in accordance with the preferred embodiment, among any other capabilities of the debugger is the capability to trigger a breakpoint upon occurrence of the defined triggering circumstances. This process is illustrated in FIG. 4 as block 406, and shown in greater detail in the flow diagram of FIG. 6.

Figure 6A:
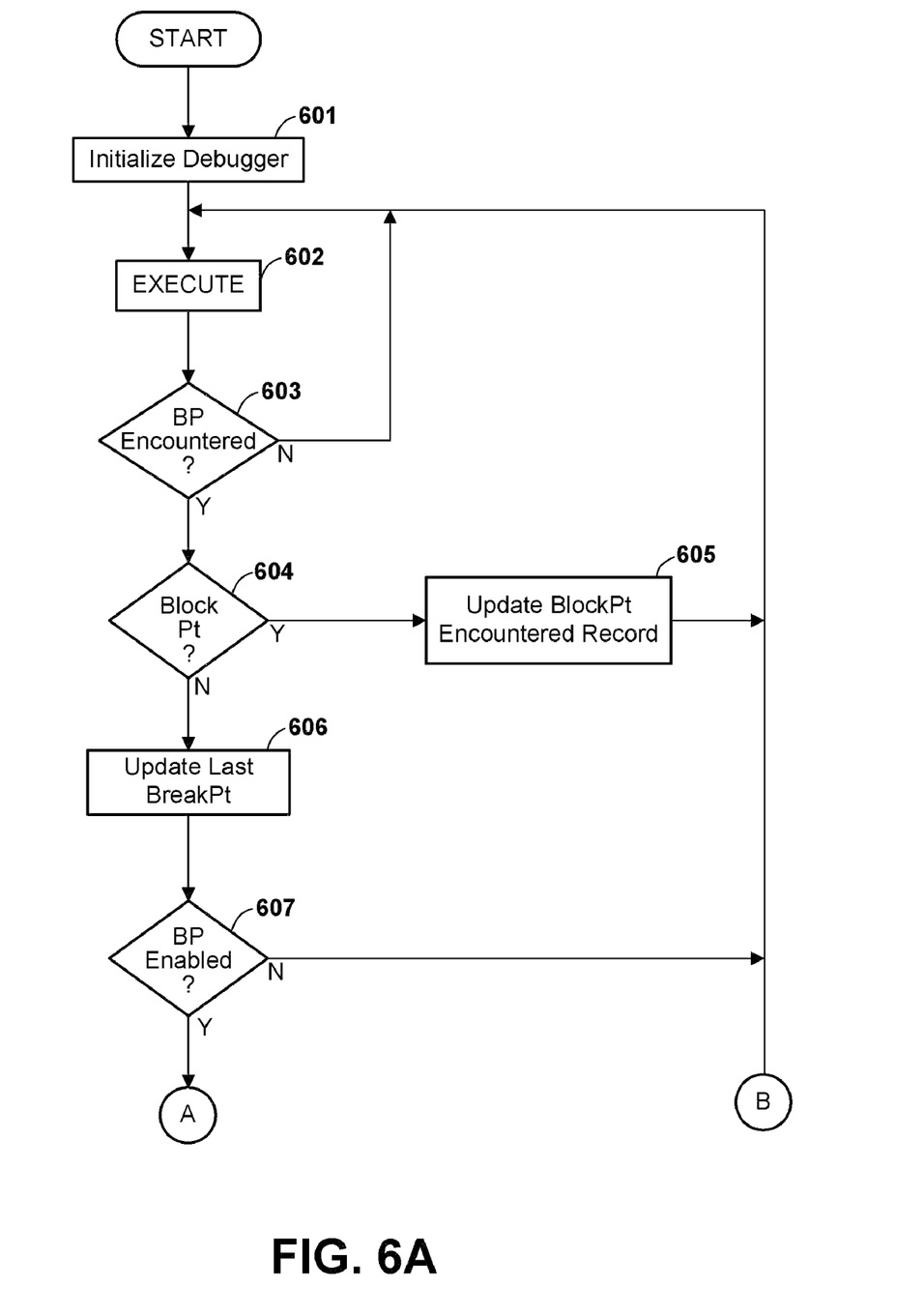
FIGS. 6A and 6B (herein collectively referred to as FIG. 6) are a flow diagram showing in expanded form the processing of executing a program in debug mode and handling breakpoints encountered, within the process of FIG. 4, according to the preferred embodiment.
Figure 6B:
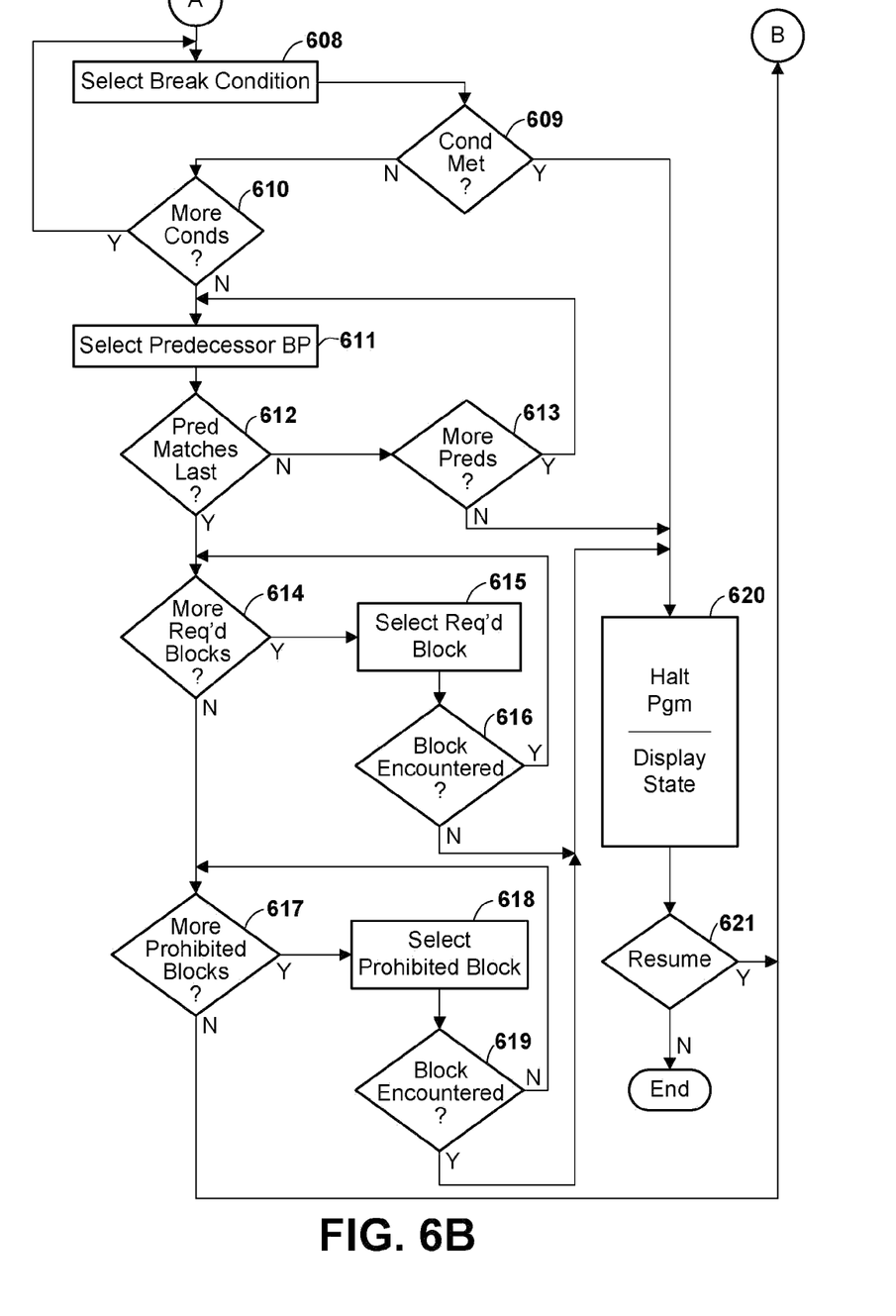

Referring to FIG. 6, to run the program in debug mode, the debugger is initialized (block 601). Initializing may involve any of various known steps, but in particular, the breakpoint control record 216 is accessed and internal data structures are initialized to detect the defined breakpoints/blockpoints. Additionally, breakpoints/blockpoints encountered record 222 is initialized to an initial value. Preferably, record 222 comprises an array of flags for the blockpoints, indicating, with respect to each blockpoint, whether it has been encountered. It also includes a last breakpoint encountered value, which is initialized to a null value.

The program being run in debug mode is then executed (block 602). During execution, debugger monitors the program for breakpoints. If a breakpoint/blockpoint is encountered (the 'Y' branch from block 603), the breakpoint handler 221 is invoked to handle the breakpoint.

Breakpoint handler 221 first determines whether the detected "breakpoint" was actually a blockpoint (block 604). If a blockpoint was encountered (the 'Y' branch from block 604), the record of blockpoints encountered 222 is updated to reflect that the subject blockpoint was encountered during execution (block 605), and program execution then resumes.

If a true breakpoint (not a blockpoint) was encountered (the 'N' branch from block 604), breakpoint handler 221 updates the value of the last breakpoint encountered in record 222 to the identifier of the breakpoint just encountered (block 606). This step is performed before any further processing, because the last breakpoint encountered reflects a code path taken, whether or not the breakpoint was actually triggered, or even enabled. The old value of the last breakpoint is temporarily saved for use in comparisons performed at block 612.

If the breakpoint is not enabled (the 'N' branch from block 607), the handler returns without further processing of the breakpoint, and the program continues execution at block 602. If the breakpoint is enabled (the 'Y' branch from block 607), the handler processes each of the conditions 305 specified in the breakpoint's definition entry 301. A next condition is selected from processing (block 608), and the machine state is examined to determine whether the condition is met (block 609). If the condition is met, the 'Y' branch is taken from block 609, resulting in the "firing" of the breakpoint, causing a halt in program execution (represented as block 620). If the condition is not met, and more conditions remain to be considered (the 'Y' branch from block 610), the next condition is selected and analyzed. If all conditions have been analyzed without firing the breakpoint, the 'N' branch is taken from block 610.

The breakpoint handler then determines whether the old value of the last breakpoint encountered (before updating at block 606) matches any of the expected predecessors 306 specified in the breakpoint definition. A next expected predecessor is selected (block 611), and compared with the old value of the last breakpoint encountered (block 612). If there is a match (including a wildcard match), the 'Y' branch is taken from block 612, and the breakpoint handler continues to analyze whether required or prohibited blocks were encountered, starting at block 614. If there is no match, and more expected predecessors remain in the list, the 'Y' branch is taken from block 613 to select and compare the next expected predecessor. If all expected predecessor breakpoints have been compared to the actual predecessor without finding a match, the 'N' branch is taken from block 613 to fire the breakpoint at block 620.

If the immediate predecessor breakpoint condition has been analyzed without firing the breakpoint (the 'Y' branch from block 612), the breakpoint handler determines whether any (more) required pathway basic blocks 307 are specified in the breakpoint definition 301 (block 614), and if so selects a next required pathway block (block 615). The breakpoint handler references record 222 to determine whether the selected pathway block 307 specified in the definition 301 has been encountered during execution (block 616). If so (the 'Y' branch from block 616), the breakpoint handler returns to block 614 to analyze the next required pathway block. If not, the breakpoint is fired (block 620). When all required pathway blocks have been analyzed without firing the breakpoint, the 'N' branch is taken from block 614.

Upon taking the 'N' branch from block 614, the breakpoint handler determines whether any (more) prohibited pathway basic blocks 308 are specified in the breakpoint definition 301 (block 617), and if so selects a next prohibited pathway block (block 618). The breakpoint handler references record 222 to determine whether the selected pathway block 308 specified in the definition 301 has been encountered during execution (block 619). If not (the 'N' branch from block 619), the breakpoint handler returns to block 617 to analyze the next prohibited pathway block. If so, the breakpoint is fired (block 620). When all prohibited pathway blocks have been analyzed without firing the breakpoint, the 'N' branch is taken from block 617. In this case, none of the conditions for firing the breakpoint has been met, and the breakpoint handler returns, allowing program execution to continue at block 602.

Once the breakpoint is fired, the debugger halts execution and allows the programmer to examine the program state (block 620). Typically, the debugger will display the location in the code at which execution was halted, and the reasons for halting execution (i.e., the condition which caused the breakpoint to fire). If the breakpoint fired because the predecessor breakpoint was not among the expected predecessors, or because a required or prohibited basic block was encountered, this fact is preferably communicated to the programmer via the display, along with the identity of the actual predecessor breakpoint or required/prohibited basic block. The debugger may employ any additional function, now known or hereafter developed, for examining and debugging program state following a break. Such functions may include selectively altering program variables. In particular, one such function is preferably the capability to alter the contents of record 222, as by re-initializing record 222. In some cases, the programmer may wish to resume execution after having examined program state, as indicated by the 'Y' branch from block 621. In other cases, the programmer may end the debug session (the 'N' branch from block 621).

In general, the routines executed to implement the illustrated embodiments of the invention, whether implemented as part of an operating system or a specific application, program, object, module or sequence of instructions, are referred to herein as "programs" or "computer programs". The programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of signal-bearing media used to actually carry out the distribution. Examples of signal-bearing media include, but are not limited to, recordable type media such as volatile and non-volatile memory devices, floppy disks, hard-disk drives, CD-ROM's, DVD's, magnetic tape, and transmission-type media such as digital and analog communications links, including wireless communications links. An example of signal-bearing media is illustrated in FIG. 1 as system memory 102, and as data storage devices 125-127.

In the preferred embodiment, the debugger detects that an unexpected code path has been taken and triggers a breakpoint by determining that the immediately preceding breakpoint is not among those listed as expected, or by determining that a particular expected basic block was not encountered or a particular unexpected basic block was encountered. However, there could be other means for determining that an unexpected code path has been taken as a condition for firing a breakpoint. For example, one could specify strings or sequences of basic blocks which are either expected or unexpected. One could specify a procedure calling history which is expected or unexpected. Other variations, some even more complex, are possible. The particular capabilities described herein as a preferred embodiment are intended to provide the programmer with the capability to specify code path at a varying level of detail without undue complexity. Typically, the number of basic blocks far exceeds the number of breakpoints, so that by specifying the immediate predecessor breakpoint(s), the programmer is thinking of program flow on a larger scale. Specifying particular basic blocks enables the programmer to specify at a finer level of detail (usually closer to the subject breakpoint) the actual path taken.

In the preferred embodiment, an integrated programming development environment having a debug tool is used to define multiple breakpoints and to execute a program in debug mode, the debugger controlling the firing of breakpoints according to breakpoint conditions defined by the programmer. However, it will be understood that breakpoints could be introduced and fired using different environments or mechanisms from those described. Several such alternatives are mentioned herein by way of example, it being understood that these are not intended to be exhaustive. For example, the debugger need not be part of an integrated program development environment, and might be a stand-alone utility. Furthermore, breakpoints might be inserted into the code, or execute at run-time, using different means. Breakpoints could be in-lined in the code, meaning the code necessary for execution of the breakpoint could be contained in the computer program itself; such code could contain hard-coded conditions for firing the breakpoint, or could access data structures from which the conditions are obtained. Breakpoints could in inserted into the code at different stages of development from those illustrated in FIG. 4 and described herein, e.g., breakpoints could be written directly into source code.

Although a specific embodiment of the invention has been disclosed along with certain alternatives, it will be recognized by those skilled in the art that additional variations in form and detail may be made within the scope of the following claims:

What is claimed is:

1. A computer program product for analyzing a developing computer program, comprising:
a plurality of executable instructions recorded on a non-transitory computer recordable type media, wherein said instructions, when executed by at least one processor of a digital computing device, cause the device to perform the steps of:

receiving a user-specified definition of a plurality of breakpoints for said developing computer program, at least one of said breakpoints including a respective expected code path condition;

monitoring said plurality of breakpoints during execution of said developing computer program;

with respect to each breakpoint including a respective expected code path condition encountered during execution of said developing computer program, determining whether an actual code path taken during execution of said developing computer program matches the respective expected code path condition of the encountered breakpoint; and halting execution of said developing computer program if said actual code path taken during execution of said developing computer program does not match the expected code path condition regardless of the condition of any key variable specified as a condition of the conditional breakpoint.

2. The program product of claim 1, wherein said program product is an integrated programming development environment comprising a source editor, a compiler, and a debugger.

3. The program product of claim 1, wherein said step of receiving a user-specified definition of a plurality of breakpoints comprises, for said at least one breakpoint including a respective expected code path condition, receiving a user-specified definition of a respective set of expected predecessor breakpoints.

4. The program product of claim 1, wherein said step of receiving a user-specified definition of a plurality of breakpoints comprises, for said at least one breakpoint including a respective expected code path condition, receiving a user-specified definition of a respective set of basic blocks required to be encountered during execution before the respective breakpoint.

5. The program product of claim 1, wherein said step of receiving a user-specified definition of a plurality of breakpoints comprises, for said at least one breakpoint including a respective expected code path condition, receiving a user-specified definition of a respective set of basic blocks prohibited from being encountered during execution before the respective breakpoint.

6. The program product of claim 1, wherein said step of receiving a user-specified definition of a plurality of breakpoints comprises, for at least one of said breakpoints including a respective expected code path condition, receiving a user-specified definition of at least one respective additional condition.

7. The program product of claim 6, wherein said step of halting execution of said program is performed if said actual code path taken during execution of said computer program does not match the expected code path condition, or if said at least one respective additional condition is met.

8. The program product of claim 1, wherein said step of receiving a user-specified definition of a plurality of breakpoints comprises the steps of:

displaying code statements of said computer program to a user;

interactively receiving a user selection of a code statement as the location of a breakpoint having an expected code path condition;

responsive to receiving said user selection, displaying code statements which necessarily execute before the selected code statement in a highlighted form; and interactively receiving a user selection of said expected code path condition.

9. The program product of claim 8, wherein said step of interactively receiving a user selection of said expected code path condition comprises:

interactively receiving a user selection of a code statement as the location of a basic block of code with which an expectation with respect to code path during execution is associated;

responsive to receiving said user selection of a code statement as the location of a basic block, determining the basic block to which the selected code statement belongs;

displaying code statements in the basic block containing said selected code statement in a highlighted form.

10. The program product of claim 9, wherein said program product further causes the digital computing device to perform the step of:

interactively receiving a user indication of said expectation with respect to code path during execution associated with the basic block containing the selected code statement;

wherein said step of displaying code statements in the basic block containing the selected code statement in a highlighted form comprises displaying said statements in a first highlighted form responsive to a user indication of a first expectation with respect to code path during execution, and displaying said statements in a second highlighted form responsive to a user indication of a second expectation with respect to code path during execution, said second highlighted form being visually distinct from said first highlighted form.

* * * * *